(12) United States Patent
Wen et al.

(10) Patent No.: US 8,504,009 B2
(45) Date of Patent: Aug. 6, 2013

(54) METHOD OF SETTING THE DISPATCH AREA BASED ON THE CLUSTER SYSTEM OF CDMA TECHNOLOGY

(75) Inventors: Zhigang Wen, Shenzhen (CN); Mengjiao Ding, Shenzhen (CN); Jinlong Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 898 days.

(21) Appl. No.: 12/064,553

(22) PCT Filed: Aug. 23, 2005

(86) PCT No.: PCT/CN2005/001313
§ 371 (c)(1),
(2), (4) Date: Oct. 15, 2008

(87) PCT Pub. No.: WO2007/025407
PCT Pub. Date: Mar. 8, 2007

(65) Prior Publication Data
US 2009/0111455 A1    Apr. 30, 2009

(51) Int. Cl.
*H04M 11/00*    (2006.01)
*H04W 4/00*    (2009.01)

(52) U.S. Cl.
USPC ........ 455/421; 455/426.1; 455/433; 455/440; 455/519; 455/520

(58) Field of Classification Search
None
See application file for complete search history.

(56) References Cited

U.S. PATENT DOCUMENTS

| | | | |
|---|---|---|---|
| 5,850,611 A * | 12/1998 | Krebs | 455/518 |
| 7,260,396 B2 * | 8/2007 | Balachandran et al. | 455/435.1 |
| 7,729,303 B2 * | 6/2010 | Jiang et al. | 370/320 |
| 2004/0180682 A1 * | 9/2004 | Kim | 455/518 |
| 2004/0203773 A1 * | 10/2004 | Balasubramanian et al. | 455/435.1 |

* cited by examiner

*Primary Examiner* — Yuwen Pan
*Assistant Examiner* — Fanghwa Wang
(74) *Attorney, Agent, or Firm* — IPSG, P.C. Intellectual Property Law

(57) ABSTRACT

Methods for allocating dispatch service areas of a trunking system based on code division multiple access technology, including assigning groups of a fleet to dispatch service areas formed from non-overlapping dispatch location areas on the push-to-talk register of a trunking system. The assignment information is shared between the network, the mobile station, and the base station to control the trunking conversation of the mobile station.

15 Claims, 3 Drawing Sheets

METHOD OF SETTING THE DISPATCH AREA BASED ON THE CLUSTER SYSTEM OF CDMA TECHNOLOGY

FIELD OF THE INVENTION

The present invention relates to mobile communication field, more particularly, relates to method for allocating dispatch service areas of a code division multiple access trunking communication system.

BACKGROUND OF THE INVENTION

Trunking communication system has the main characteristic of channel sharing and dynamically using, it is a commanding and dispatching system, and in developed countries which have higher demand of trunking service, it is widely used in the field such as enterprise, facility, industry and mining, oil field, farm, public security, police agent, army and etc.

The main characteristic of the CDMA (Code Division Multiple Access) trunking communication system lies in: using half-duplex communication mode, fast call setup, and supporting group call (viz. a one-to-many calling mode). In the CDMA trunking communication system it requires group users to share forward channels in the same cell, the user can push the PTT(push-to-talk) key to talk to the other group members during group call. Such PTT service is widely used in walkie-talkie system and trunking system for serving commanding and dispatching function to fleet, such as public safety, fire protection, traffic and transport, airport and aviation, building site, massive congregation, military dispatch and etc. With the advancement of the society and quick development of the mobile communication technology, the field of personal communication becomes broader and broader, also trunking service turns to personal application gradually, e.g. group chat between young people, communication between members within a family and etc. Demand brings innovation, and application brings advancement of product, along with the wide development of mobile communication value-added service, the CDMA standard trunking communication system with group call and information transmission functions becomes a new mobile value-added service.

In trunking communication, each fleet has a certain active area, which is called the dispatch service area, in this specific service area, all fleet members can perform trunking communication. When a user is out of the dispatch service area, the system will not provide trunking service any more, here a out-the-dispatch-area indication will be displayed on the screen of a mobile station. So far there is no method for setting up dispatch service areas in a digital trunking system based on CDMA technology.

SUMMARY OF THE INVENTION

The object of the present invention is to provide a method for allocating dispatch service areas of a trunking system based on code division multiple access technology, which can efficiently solve the technical issues such as out of dispatch service area indication and service area selection.

In order to achieve the above object, the present invention provides a method for allocating dispatch service areas of a trunking system based on code division multiple access technology, characterized in comprising the following steps:

Step 1, dividing the service area of a trunking system into a plurality of dispatch location areas geographically not overlapping each other;

Step 2, assigning one or a plurality of dispatch location areas as dispatch service area for each fleet on the push-to-talk home register of above trunking system, wherein said dispatch service area acts as a working area of above fleet;

Step 3, assigning dispatch service areas for groups of above fleet, wherein the dispatch service areas of the groups should be full set or subset of the fleet's dispatch service area;

Step 4, synchronizing information of the dispatch service areas of the groups from network side to mobile station by updating user information, Step 5, making system parameter message of a base station to have the information of a dispatch location area that this cell belong to, to inform whether the mobile station is out of a dispatch service area, and the push-to-talk home register controlling the trunking conversation of the mobile station based on whether the mobile station locates in the dispatch service area.

The above mentioned method is characterized in that, in said Step 1, said dispatch location area comprises one or a plurality of cells.

The above mentioned method is characterized in that, said plurality of cells comprised in said dispatch position area come from one or a plurality of base stations under a single push-to-talk home register.

The above mentioned method is characterized in that said Step 5 further comprises:

Step a, the base station receiving a call connect request message sent from a originator that requires for a talk and transmitting the call connect request message to a dispatch server of said trunking system via a dispatch client of said trunking system;

Step b, after receiving said call connect request message, said dispatch server sending a request to said push-to-talk home register for authorization; going on to Step c if the authorization is passed; otherwise, a trunking dispatch server sending a release message to the base station, and the call being failed, Step c, said push-to-talk home register sending the originator's group dispatch service area information to said dispatch server;

Step d, said dispatch server judging whether the cell that the originator located in belongs to the dispatch service area of said group or not, proceeding to Step e in case of "yes", or else, proceeding to Step f;

Step e, said dispatch server sending the call connect request message for originator and call paging message for terminators to the dispatch client, the call paging message includes the originator's group dispatch service area information, the group call between the originator and the terminators will be established via the dispatch client and the base station.

Step f, said dispatch server sending a call rejection message to said dispatch client, the reject reason that the mobile station is out of dispatch service area will be displayed on the mobile station's screen.

The above method is characterized in that said Step e further comprises:

Step e1, said dispatch server returning said call connect request message and said call paging message containing the dispatch service area information to said dispatch client;

Step e2, the base station paging the terminators within said dispatch service area;

Step e3, the base station assigning wireless resource for the group and informing said dispatch client that group call setup is finished;

Step e4, said dispatch server authorizing the originator to talk, group call setup being finished, and the trunking talk beginning.

The above method is characterized in that said Step f further comprises:

Step f1, said dispatch server sending the call rejection message to said dispatch client;

Step f2, the base station sending a release message to the originator;

Step f3, after receiving said release message, the originator displaying that the reason for call rejection is that originator is out of group's dispatch service area.

The above mentioned method is characterized in that said base station system is connected with said dispatch client via A8d/A9d interface, wherein A8d bears service traffic and A9d bears signaling.

The above mentioned method is characterized in that said dispatch client is connected with said dispatch server via A10d/A11d interface, wherein A10d bears service traffic and A11d bears signaling.

The above mentioned method is characterized in that said dispatch server and said home register are connected via RADIUS interface; said home register stores user information of said fleet and said group, and performs authentication, authentication and accounting.

The advantage of the present invention lies in: by employing the method of the present invention, it implements the dispatch service area function in the trunking system, achieves the important trunking functions, such as service area selection and out-the-dispatch-area indication and etc, and provides a flexible method for allocating dispatch service areas of a fleet, wherein dispatch service areas can be arranged separately for each group within the fleet, so as to meet the requirement for implementing the functions such as out-the-dispatch-area indication, service area selection and etc of the trunking system.

EMBODIMENTS OF THE INVENTION

Figure 1:
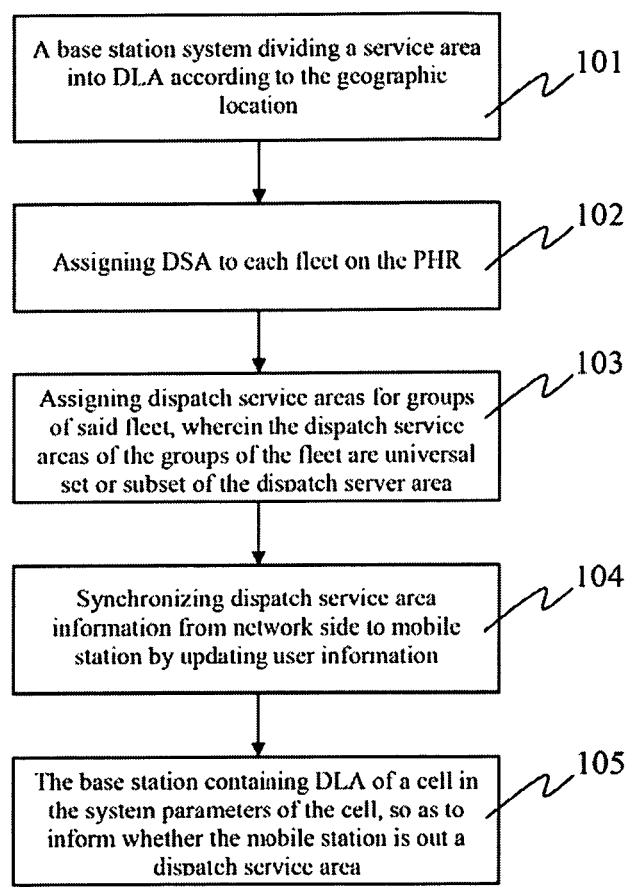
FIG. 1 is a flow chart of the steps of the method according to the present invention.

Hereinafter, embodiments of the invention will be described by referring to the drawings.

Figure 2:
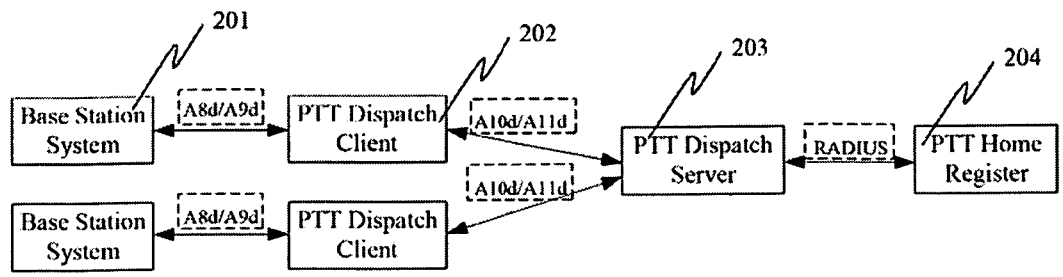
FIG. 2 is a network structure diagram of the trunking system for implementing the arrangement of dispatch service areas according to the present invention.

The present invention provides a method for allocating dispatch service areas, which is capable of meeting the requirement of performing the service functions, such as out-the-dispatch-area indication, service area selection and etc, of a trunking system. The method for allocating dispatch service areas in a CDMA trunking system provided by the present invention relates to a trunking system network composed of PDS (PTT Dispatch Server), PDC (PTT Dispatch Client), BSS (Base Station System), and PHR (PTT Home Register), as shown in FIG. 1, the method comprises the following steps:

Step 101, a base station system dividing a service area into DLA (Dispatch Location Area) according to the geographic location, wherein the DLA may comprise one or a plurality of cells, and does not overlap each other geographically, and each DLA is unique under a single PHR;

Step 102, assigning DSA (Dispatch Server Area) for each fleet on the PHR, wherein said DSA comprises one DLA or a plurality of DLAs and acts as a working area of said fleet, Step 103, assigning dispatch service areas for groups of said fleet, wherein the dispatch service areas of the groups should be full set or subset of the dispatch server area of the fleet;

Step 104, synchronizing dispatch service area information from network side to mobile station by updating user information;

Step 105, making system parameter message of the base station to have the information of a dispatch location area (DLA) that this cell belong to, to inform whether the mobile station is out of the dispatch service area;

FIG. 2 shows a network structure diagram of the trunking system for implementing the arrangement of dispatch service areas.

It can be seen from the figure that the whole network is composed of PTT dispatch server 203, PTT dispatch client 202, base station system 201, and PTT home register 204. The base station system 201 is connected with the PTT dispatch client 202 via A8d/A9d interface, wherein A8d bears service traffic and A9d bears signaling. The PTT dispatch client 202 is connected with the PTT dispatch server 203 via A10d/A11d interface, wherein A10d bears service traffic and A11d bears signaling. The PDS 203 and the PHR 204 are connected with each other via RADIUS (Remote Authentication Dial In User Service) interface, wherein the PHR mainly stores trunking user information and performs authentication, authorization and accounting.

Figure 3:
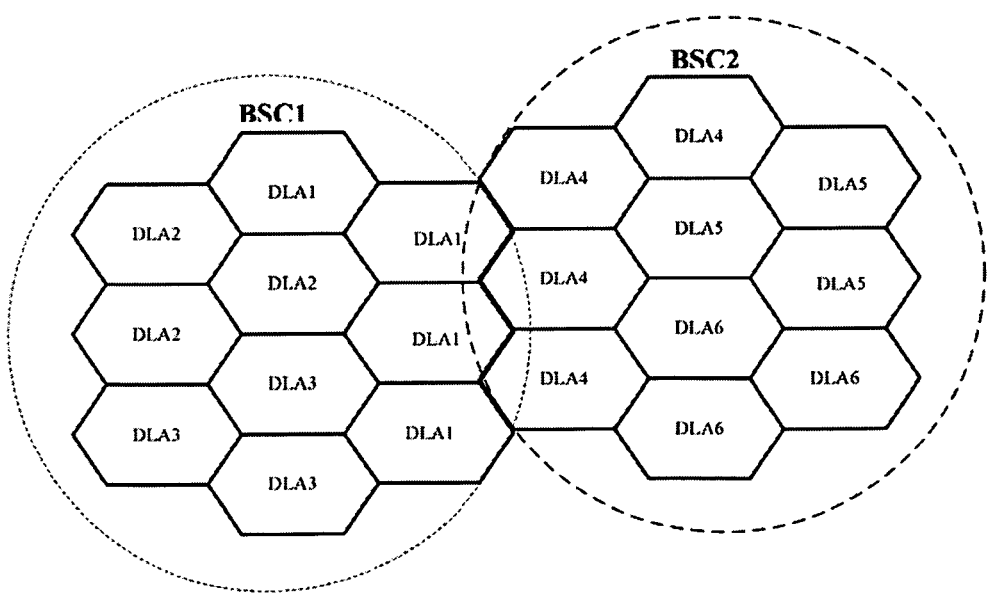
FIG. 3 is a schematic diagram of allocating dispatch service areas at the base station side according to the present invention.

FIG. 3 shows the diagram of the method for allocating dispatch service areas at the base station side.

In the figure, each hexagon indicates a cell, and BSC1 and BSC2 belong to a single PHR. It can be seen from the figure that the DLA may comprise one cell or a plurality of cells, and does not overlap each other geographically under a single PHR. DSA of a fleet may comprise one DLA or a plurality of DLAs. Moreover, the DLAs comprised in a single fleet DSA may either border upon each other or not, or they may also belong to different BSCs. For instance, the DSA of the fleet may either comprise DLA1 and DLA4 simultaneously or comprise DLA2 and DLA5.

Figure 4:
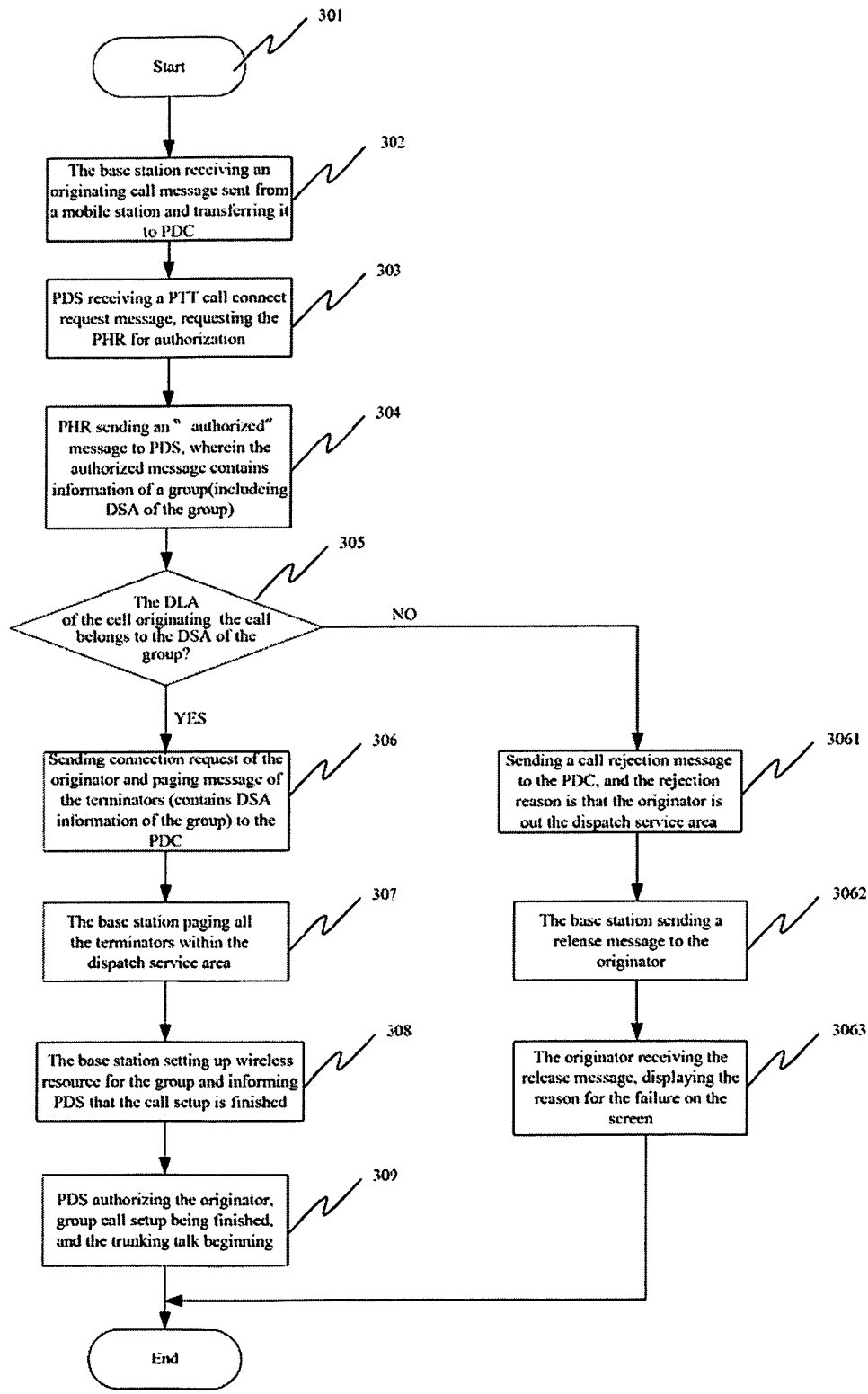
FIG. 4 is a flow chart illustrating that a user performs a trunking call after dispatch service areas are arranged according to the present invention.

FIG. 4 shows a schematic diagram that a user of a fleet performs a trunking call; the process that the user performs a trunking call comprises the following steps:

Step 301, start.

Step 302, the base station receiving an originating call message sent from a mobile station and transferring it to a PTT dispatch client.

Step 303, the dispatch server requesting the PHR (PTT home register) for authorization after receiving a PTT call connect request message.

Step 304, the PHR sending an "authorized" message to the PDS, wherein the authorized message contains information of a group, and the group information includes DSA (dispatch server area) of the group.

Step 305, the PDS judging whether the DLA of the cell originating the call belongs to the DSA of the group or not; going through the normal call procedure 306 in case of "yes", and going through the release procedure 3061 in case of "no".

Step 306, the PDS sending a PTT call connection request message of the originator and a call paging message of all terminators to the PDC, wherein the paging message of the terminators contain DSA information of the group.

Step 3061, sending a call rejection message to the PDC, and the rejection reason is that the originator is out the dispatch service area.

Step 3062, the base station sending a release message to the originator.

Step 3063, after receiving the release message, the originator displaying on the screen that the reason for call setup failure is that the call is originated out the dispatch service area.

Step 307, the base station paging the terminators within the dispatch service areas.

Step 308, the base station setting up wireless resource for the group and informing the PDS that the call setup is finished.

Step 309, the PDS authorizing the originator to talk, group call setup being finished, and the trunking talk beginning.

The performance of dispatch service area function in a trunking network provided by the present invention reduces the load of paging channels efficiently, implements the important trunking functions, such as service area selection, out-the-dispatch-area indication and etc conveniently, and provides a flexible method for allocating fleet dispatch service areas.

Of course, this invention can be implemented with a variety of other cases, the technical in this field can make any amendment or equivalent replacement without diverting from the spirit and essence of this invention, but the corresponding changes of this invention should be under the protection of the claimed rights requirements Industrial Applicability The present invention divides the service area of the base station system into a plurality of dispatch location areas not overlapping each other geographically, and assigns one or a plurality of said dispatch location areas as dispatch service area to each fleet so as to cause dispatch service areas of a group in said fleet to be full set or subset of said fleet dispatch server area, thus, the dispatch service area function is implemented in a trunking network, it can reduce the load of paging channels efficiently, perform the important trunking functions such as area selection, out-the-dispatch-area indication and etc. conveniently, and provide a flexible method for allocating fleet dispatch service areas. The method of the present invention is applicable to the field of dispatch service area arrangement in a code division multiple access standard trunking communication system. The method according to the present invention is also adapted to application in other fields having similar conditions.

What is claimed is:

1. A method for allocating dispatch service areas of a trunking system based on code division multiple access technology, characterized in comprising the following steps:

Step 1, dividing the service area of a trunking system into a plurality of dispatch location areas geographically not overlapping each other;

Step 2, assigning one or a plurality of dispatch location areas as dispatch service area for each fleet on the push-to-talk home register of said trunking system, wherein said dispatch service area acts as a working area of said fleet;

Step 3, assigning dispatch service areas for groups of said fleet, wherein said dispatch service areas of the groups should be full set or subset of said dispatch service area of the fleet;

Step 4, synchronizing assigning information pertaining to said dispatch service areas for the groups of said fleet from network side to a mobile station such that said network side and said mobile station have the same information about said assigning information pertaining to said dispatch service areas for the groups of said fleet;

Step 5, configuring a system parameter of a cell of a base station such that the system parameter at least includes information pertaining to a dispatch location associated with the cell, the system parameter thus indicating whether the mobile station is beyond the dispatch service area associated with the cell, and said push-to-talk home register controlling a trunking conversation of said mobile station based on whether the mobile station locates in the dispatch service area associated with the cell.

2. The method according to claim 1, characterized in that, in said Step 1, said dispatch location area comprises one or a plurality of cells.

3. The method according to claim 2, characterized in that said plurality of cells comprised in said dispatch location area come from one or a plurality of base stations under a single push-to-talk home register.

4. The method according to claim 2, characterized in that said Step 5 further comprises:

Step a, the base station receiving a call connect request message sent form a originator that requires for a talk and transmitting the call connect request message to a dispatch server of said trunking system via a dispatch client of said trunking system;

Step b, after receiving said call connect request message, said dispatch server sending a request to said push-to-talk home register for authorization; going on to Step c if the authorization is passed; otherwise, said dispatch server sending a release message to the base station, and the call being failed;

Step c, said push-to-talk home register sending the originator's group dispatch service area information to said dispatch server;

Step d, said dispatch server judging whether the cell that said originator located in belongs to the dispatch service area of said group or not, proceeding to Step e in the case of "yes", or else, proceeding to Step f;

Step e, said dispatch server sending the call connect request message of said originator and call paging message of the terminators that said originator requires to talk with to said dispatch client, the call paging message includes the originator's group dispatch service area information, and the group call between the originator and the terminators will be established via the dispatch client and the base station;

Step f, said dispatch server sending a call rejection message to said dispatch client, the reject reason that the mobile station is out of dispatch service area will be displayed on the mobile station's screen.

5. The method according to claim 4, characterized in that Step e further comprises:

Step e1, said dispatch server returning said call connect request message and said call paging message containing the dispatch service area information to said dispatch client;

Step e2, the base station paging said terminators within said dispatch service area;

Step e3, the base station assigning wireless resource for the group and informing said dispatch client that group call setup is finished;

Step e4, said dispatch server authorizing said originator, group call setup being finished, and the trunking talk beginning.

6. The method according to claim 4, characterized in that said Step f further comprises:

Step f1, said dispatch server sending the call rejection message to said dispatch client;

Step f2, the base station sending a release message to said originator;

Step f3, after receiving said release message, said originator displaying that the reason for call rejection is that said originator is out the dispatch service area of said group.

7. The method according to claim 4, characterized in that said base station system is connected with said dispatch client via A8d/A9d interface, wherein A8d bears service traffic and A9d bears signaling.

8. The method according to claim 4, characterized in that said dispatch client is connected with said dispatch server via A10d/A11d interface, wherein A10d hears service traffic and A11d bears signaling, 9. The method according to claim 4, characterized in that said dispatch server and said home register are connected via RADIUS interface; said home register stores user information of said fleet and said group, and performs authentication, authorization and accounting.

10. The method according to claim 3, characterized in that said Step 5 further comprises:

Step a, the base station receiving a call connect request message sent form a originator that requires for a talk and transmitting the call connect request message to a dispatch server of said trunking system via a dispatch client of said trunking system;

Step b, after receiving said call connect request message, said dispatch server sending to request to said push-to-talk home register for authorization; going, on to Step c if the authorization is passed; otherwise, said dispatch server sending a release message to the base station, and the call being failed;

Step c, said push-to-talk home register sending the originator's group dispatch service area information to said dispatch server:

Step d, said dispatch server judging whether the cell that said originator located in belongs to the dispatch service area of said group or not, proceeding to Step e in the case of "yes", or else, proceeding to Step f;

Step e, said dispatch server sending the call connect request message of said originator and call paging message a the terminators that said originator requires to talk with to said dispatch client, the call paging message includes the originator's group dispatch service area information, and the group call between the originator and the terminators will be established via the dispatch client and the base station;

Step f, said dispatch server sending a call rejection message to said dispatch client, the reject reason that the mobile station is out of dispatch service area will be displayed on the mobile station's screen.

11. The method according to claim 10, characterized in that Step e further comprises:

Step e1, said dispatch server returning, said call connect request message and said call paging, message containing the dispatch service area information to said dispatch client;

Step e2, the base station paging said terminators within said dispatch service area;

Step e3, the base station assigning wireless resource for the group and informing said dispatch client that group call setup is finished;

Step e4, said dispatch server authorizing said originator, group call setup being finished, and the trunking talk beginning.

12. The method according to claim 10, characterized in that said Step f further comprises:

Step f1, said dispatch server sending the call rejection message to said dispatch client, Step f2, the base station sending a release message to said originator;

Step f3, after receiving said release message, said originator displaying that the reason for call rejection is that said originator is out the dispatch service area of said group.

13. The method according to claim 10, characterized in that said base station system is connected with said dispatch client via A8d/A9d interface, wherein A8d bears service traffic and A9d bears signaling.

14. The method according to claim 10, characterized in that said dispatch client is connected with said dispatch server via A10d/A11d interface, wherein A10d bears service traffic and A11d hears signaling.

15. The method according to claim 10, characterized in that said dispatch server and said home register are connected via RADIUS interface; said home register stores user information of said fleet and said group, and performs authentication, authorization and accounting.

* * * * *